Jan. 8, 1924.
A. F. SULZER
1,479,939
PHOTOGRAPHIC FILM FOR X-RAY WORK
Filed Sept. 27, 1922
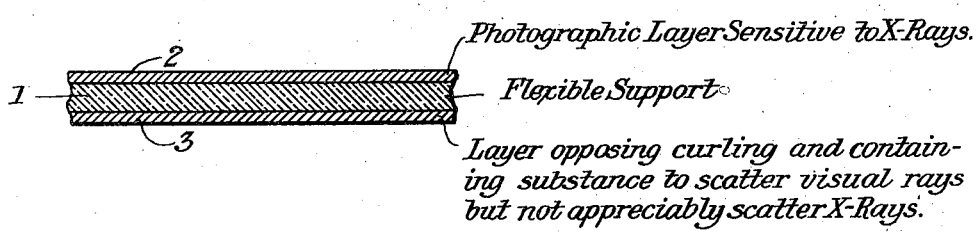
Photographic Layer Sensitive to X-Rays.
Flexible Support
Layer opposing curling and containing substance to scatter visual rays but not appreciably scatter X-Rays.
INVENTOR.
Albert F. Sulzer,
BY R. L. Stinchfield
ATTORNEY.

Patented Jan. 8, 1924.

1,479,939

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM FOR X-RAY WORK.

Application filed September 27, 1922. Serial No. 590,970.

*To all whom it may concern:*

Be it known that I, ALBERT F. SULZER, a citizen of the United States of America, residing at Rochester, in the county of Monroe and State of New York, have invented certain new and useful Improvements in Photographic Films for X-Ray Work, of which the following is a full, clear, and exact specification.

This invention relates to photographic films particularly adapted to X-ray work. One object of the invention is to provide a flexible film of this character in which the tendency to curl is strongly counteracted by an appropriate layer which has the additional functions of scattering visual rays but not appreciably absorbing or scattering X-rays. Other objects will hereinafter appear.

In the accompanying drawing the single figure shows diagrammatically in cross section on an exaggerated scale a portion of a film embodying my invention.

The support 1 may be of any usual type, such as a well known nitrocellulose sheet containing the usual softeners or addition agents. It is substantially transparent to X-rays and is preferably transparent also to visual rays. On this support 1 is coated a layer 2 of photographic material sensitive to X-rays. In the preferred form of my invention, this comprises a gelatino-silver haloid emulsion especially sensitive to X-rays.

A film comprising merely the layers 1 and 2 has two drawbacks or limitations. The contraction and expansion of the layer 2 tend to cause the whole film to curl or buckle, especially after treatment in photographic baths and subsequent drying. When the image produced on such a film is viewed to the best advantage, it is necessary to hold it in front of a diffused source of light, such as a ground glass illuminated from behind. I have discovered that both of these drawbacks can be avoided by coating the back of the support 1 (that is, the face opposite the one which carries layer 2) with a layer 3 having approximately the same contracting and expanding tendencies as the layer 2. In the preferred form of my invention this comprises a layer of gelatine. In this layer of gelatine I distribute uniformly a substance which, in the proportions employed, scatters visual rays, but does not appreciably scatter X-rays. Such a substance may be calcium sulfate. When very finely divided and uniformly distributed in the gelatine layer, say in the proportion of 1.0 grams per square foot, it very effectually acts as a diffusing screen to facilitate inspection of the finished picture in layer 2. The visual rays, being diffused in passing through layer 3, uniformly and comfortably illuminate the image. But such diffusing material has no appreciable effect upon the X-rays, either by way of absorption or scattering. Consequently several films embodying my invention may be placed one above the other in the taking of an X-ray record in the way in which previous films have been employed in the art. My improved film may, therefore, be used in any way that the previous ones have been employed without any restriction. But at the same time my layer 3 has the triple function of counteracting the tendency to curl, diffusing the visual rays to facilitate inspection of the finished record and permitting the X-rays to pass without appreciable absorption or scattering.

Of course, equivalent scattering materials may be employed, even barium sulfate being useful. Those containing atoms of very high atomic weight, like lead atoms, are not preferred, because only lessened concentrations of them can be employed in the gelatine layer 3. They must not be present in amounts sufficient to substantially absorb or scatter the X-rays; and when present in this lessened ratio, their scattering of the visual light is somewhat less. While the use of small amounts of such salts comes within the broader aspects of my invention, I prefer to use a material none of the atoms of which are of more than moderate atomic weight. In this way the scattering of the visual rays can be much increased without any harmful effect on the transmission of X-rays. Of course, the substance mixed in the gelatine will be one that is sufficiently resistant to the ordinary photographic baths.

Having thus described my invention, what I claim as new and desire to secure by Letters Patent is:

1. An article of manufacture comprising a supporting flexible sheet of light transmitting material having on one surface thereof a coating of material sensitive to X-rays and upon the other surface a coating of material tending to counteract the tendency of the supporting sheet to curl because of the first mentioned coating, said second mentioned coating comprising material capable of scattering visual rays but not appreciably absorbing or scattering X-rays.

2. An article of manufacture comprising a supporting flexible sheet of light transmitting material having on one surface thereof a coating of material sensitive to X-rays and upon the other surface a coating of material tending to counteract the tendency of the supporting sheet to curl because of the first mentioned coating, said second mentioned coating comprising material capable of scattering visual rays but not appreciably absorbing or scattering X-rays, the optical qualities of the second mentioned coating being unaffected by photographic processes.

3. An article of manufacture comprising a support of flexible, light transmitting material, having on one surface thereof a coating of material especially sensitized for X-rays, and upon the other surface a coating of material tending to counteract the tendency of the support to curl because of the first coating, said second coating comprising very fine particles of material capable of scattering visual rays but not appreciably absorbing or scattering X-rays.

4. An article of manufacture comprising a support of flexible, light transmitting material, having on one surface thereof a coating of gelatino-bromide emulsion especially sensitized for X-rays and upon the other surface a coating of unsensitized gelatine tending to counteract the tendency of the support to curl because of the first coating, said second coating having incorporated therein in suspension, fine particles of material capable of scattering visual rays but not appreciably absorbing or scattering X-rays.

Signed at Rochester, New York, this 19th day of Sept., 1922.

ALBERT F. SULZER.